Dec. 4, 1923.
R. C. LUTZ
GOPHER TRAP
Filed Sept. 28, 1922    2 Sheets-Sheet 1
1,476,529
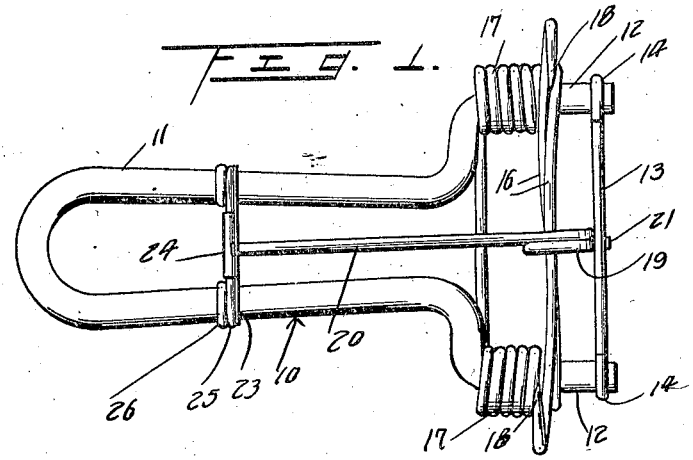
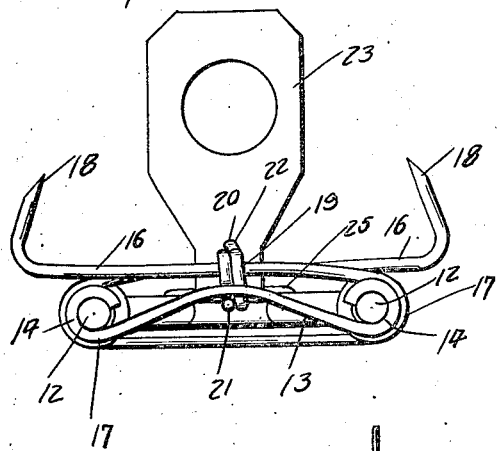
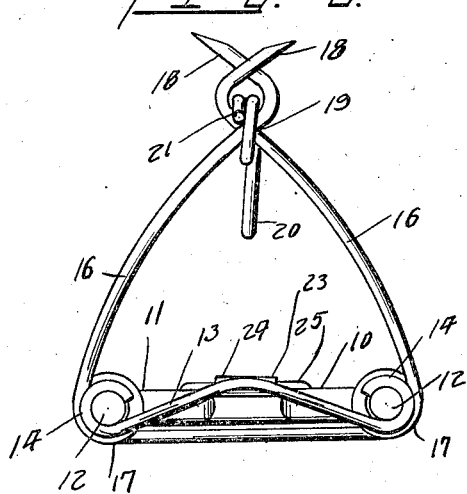
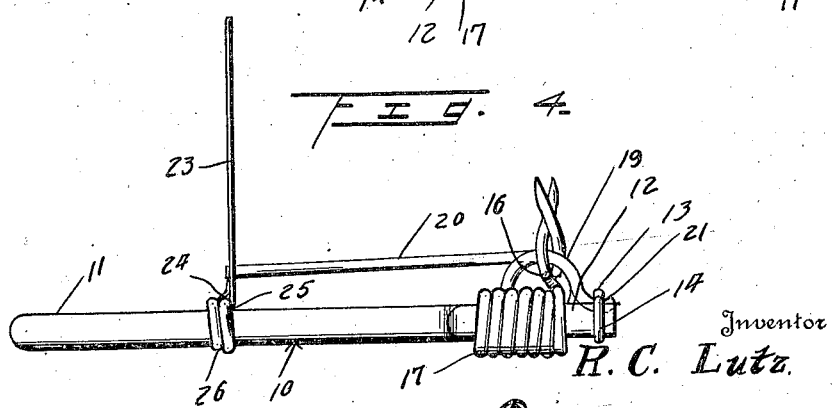
Inventor
R. C. Lutz.

Dec. 4, 1923.  
R. C. LUTZ  
GOPHER TRAP  
Filed Sept. 28, 1922   2 Sheets-Sheet 2
1,476,529
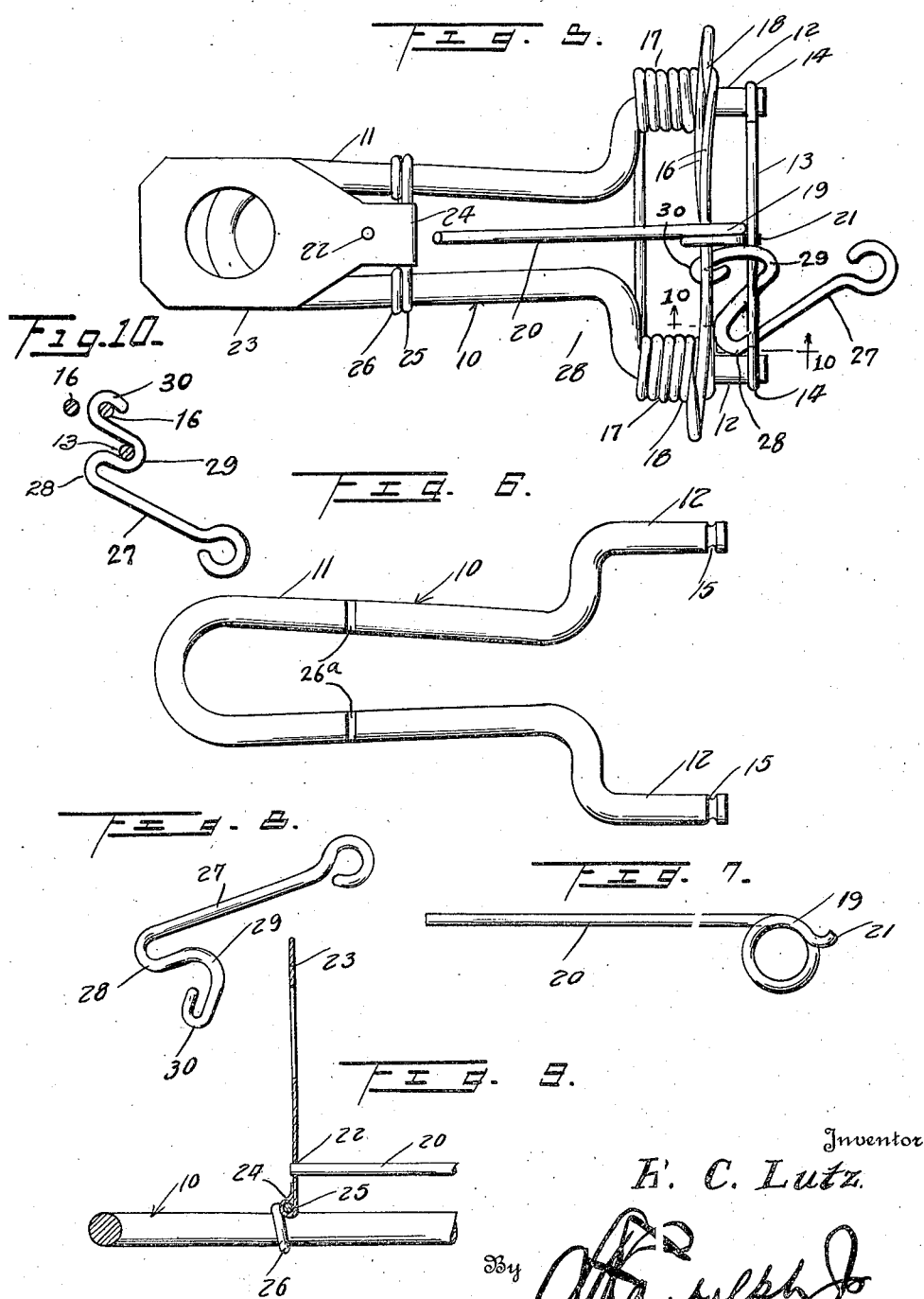

Patented Dec. 4, 1923.

1,476,529

UNITED STATES PATENT OFFICE.

ROBERT C. LUTZ, OF PAOLA, KANSAS.

GOPHER TRAP.

Application filed September 28, 1922. Serial No. 591,147.

*To all whom it may concern:*

Be it known that I, ROBERT C. LUTZ, a citizen of the United States, residing at Paola, in the county of Miami and State of Kansas, have invented certain new and useful Improvements in a Gopher Trap; and I do hereby declare the following to be a full, clear, and exact description of the invention, such as will enable others skilled in the art to which it appertains to make and use the same.

The object of the invention is to provide a simple and efficient animal trap which is designed to catch small animals and rodents under conditions preventing their escape and to provide means whereby the setting of the trap may be accomplished with the minimum of risk to the trapper or operator while insuring the springing thereof when encountered by the animal; and with these objects in view the invention consists in a construction, combination and relation of parts of which a preferred embodiment is shown in the accompanying drawings, wherein:

Figure 1 is a plan view,

Figures 2 and 3 are front views with the trap shown respectively in the "set" and in the "sprung" or engaged position, Figure 4 is a side view, Figure 5 is a view of the trap with the setting key applied thereto to hold the prongs or spur carrying arms in the set position while adjusting the latch arm, Figures 6, 7 and 8 are detail views respectively of the yoke frame, the latch arm and the key, detached from the other parts.

Figure 9 is a detail sectional view of the trigger plate and adjacent parts.

Figure 10 is a cross sectional view taken substantially on the line 10—10 of Figure 5.

The trap consists essentially of a yoke frame 10 having a looped body portion 11 of which the sides are deflected and are provided with terminal parallel spindle portions 12 connected by a tie rod 13 of which the terminal coils or eyes 14 are engaged with grooves 15 in the extremities of the spindle portions 12 of the frame.

The tie rod is preferably arched as shown between the spindle members of the frame to occupy at its center a position approximately in the plane of the upper sides of said spindle portions.

The jaws of the trap consist of arms 16 forming the terminal portions of a blank of heavy spring wire provided with spring coils 17 which respectively fit upon the spindle portions of the yoke frame, said arms terminally carrying the spurs 18 which are adapted and designed to impale the animal, said spurs being directed outwardly in the sprung position and the set position of the arms, indicated in Figure 2, disposing the spurs upwardly with relation to the frame, and with the arms disposed in crossing relation and substantially parallel with and above the plane of said frame. The jaws are connected for simultaneous closing or engaging movement by a guide eye 19 consisting of a coil formed in a latch bar 20 having a terminal 21 adapted for engagement with the tie rod 13 and an arm extending in the opposite direction from said terminal which is adapted for engagement with an opening 22 in a trigger plate 23 which is designed to occupy a position in perpendicular relation with the plane of the frame when the trap is set as indicated. The trigger plate is provided at its lower end with an eye 24 engaged to pivotally mount the plate with a cross rod 25 which spans the interval between the sides of the loop 11 of the frame, the rod 25 having terminal coils 26 embracing the arms of the loop at notches 26ª.

To facilitate the holding of one of the jaws in its tensioned or set position while the other jaw is being depressed or set and the adjustment of the latch is being effected, a key 27 may be employed as indicated in Figures 5, 8 and 10, the same consisting of a shank provided with reversed loops 28 and 29 with the extremity of the latter provided with a lateral obliquely disposed hook 30. In using the key, one of the jaws 16 is manually depressed and hook 30 thereupon engaged therewith and loop 29 engaged with rod 13 whereby such jaw 16 is set and locked in set position. The other jaw 16 may then be manually depressed and the latch 20 engaged with trigger plate 23 and the key 27 thereafter removed.

Having thus described the invention, what I claim is:—

1. An animal trap having a frame forming a base, oppositely movable spring jaws mounted upon the frame, said jaws when set being disposed in overlapping relation, a latch having a coil embracing the jaws and provided with oppositely extending arms, a cross bar carried by the frame with which one of said arms engages, and a pivotally mounted trigger plate carried by the frame and having an opening with which the extremity of the other arm of said latch engages.

2. An animal trap having a frame forming a base, oppositely movable spring jaws mounted upon the frame, said jaws when set being disposed in overlapping relation, a latch having a coil embracing the jaws and provided with oppositely extending arms, a cross bar carried by the frame with which one of said arms engages, and a pivotally mounted trigger plate carried by the frame and having an opening with which the extremity of the other arm of said latch engages, the frame being of looped form with its extremities disposed in parallel spaced relation to form spindles, and the said jaws being formed of a single blank of wire having spring coils which respectively engage said spindle portions.

3. An animal trap having a frame forming a base, oppositely movable spring jaws mounted upon the frame, said jaws when set being disposed in overlapping relation, a latch having the coil embracing the jaws and provided with oppositely extending arms, a cross bar carried by the frame with which one of said arms engages, and the pivotally mounted trigger plate carried by the frame and having an opening with which the extremity of the other arm of said latch engages, the frame being of looped form with its extremities disposed in parallel spaced relation to form spindles, and the said jaws being formed of a single blank of wire having spring coils which respectively engage said spindle portions, and said cross bar being terminally engaged with the extremities of said spindle portions and being intermediately arched for engagement by the latch.

4. An animal trap having a frame, spring jaw means carried thereby, a key having reverse loops adapted for connection to and movement on said frame to restrain said jaw means while setting the trap, and one of said loops at its free end terminating in a frame-engaging hook.

In testimony whereof I affix my signature in presence of two witnesses.

ROBERT C. LUTZ.

Witnesses:
NANCY NELSON,
W. CLYDE WEIR.